Nov. 16, 1926.
E. A. CLARK
1,606,924
DIRIGIBLE HEADLIGHT
Filed Dec. 16, 1925
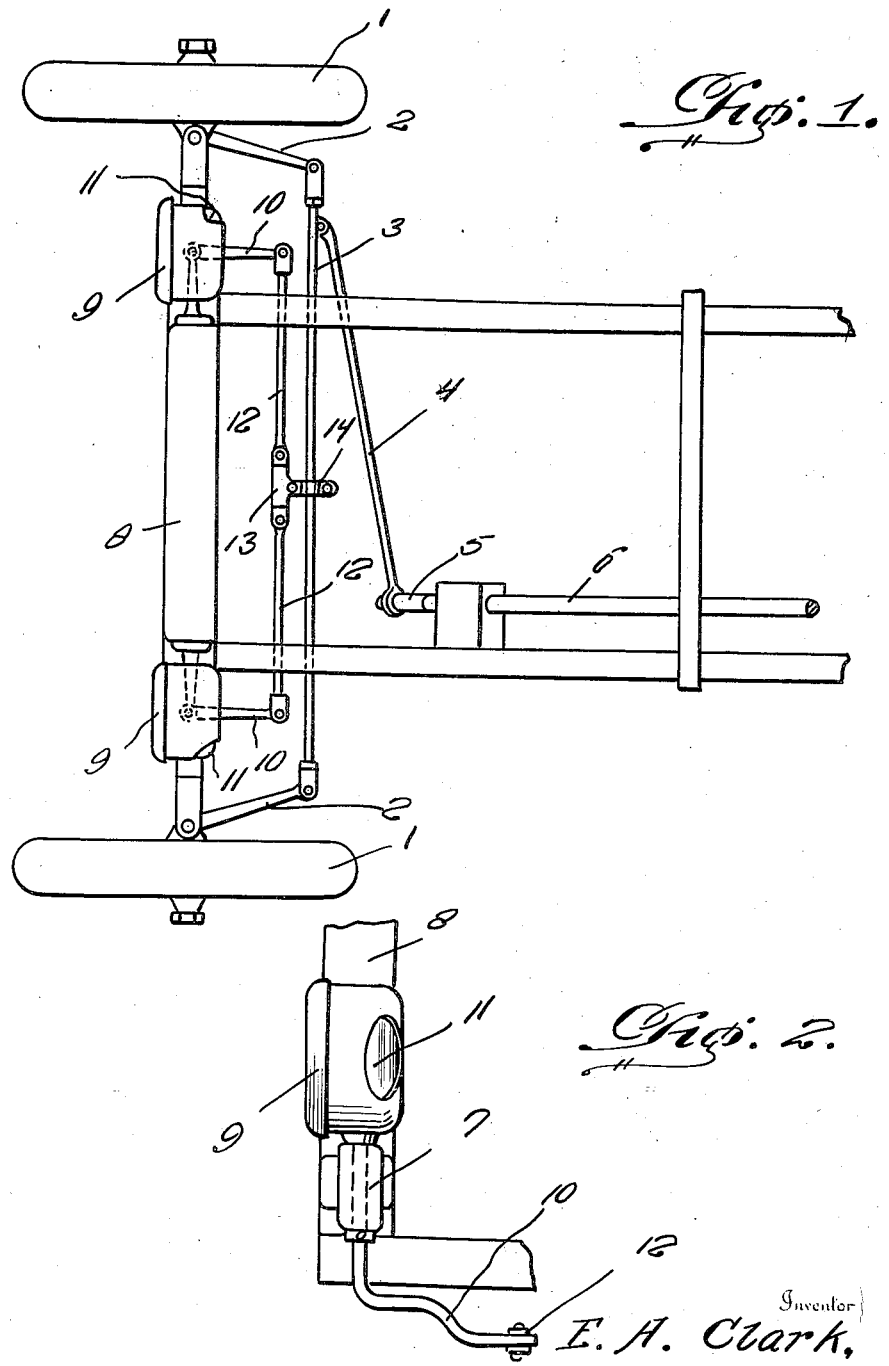

Patented Nov. 16, 1926.

1,606,924

UNITED STATES PATENT OFFICE.

EDWARD A. CLARK, OF TUNNELTON, WEST VIRGINIA.

DIRIGIBLE HEADLIGHT.

Application filed December 16, 1925. Serial No. 75,739.

This invention relates to an improved dirigible headlight structure for use upon automobiles, and similar vehicles.

My principal aim is to generally improve upon known structures of this class by providing one of comparative simplicity and durability which is such as to render it exceedingly practical in operation, positive in its action, and capable of being installed without requiring extensive alterations of the stock parts of the vehicle.

Other objects and advantages will become apparent from the following description and drawing.

In the accompanying drawing forming a part of this application and in which like numerals are employed to designate like parts throughout the same:

Figure 1 is a top plan view of the forward portion of an automobile chassis showing the improved dirigible headlight structure mounted thereon.

Figure 2 is a side elevation of one of the rotatably mounted headlights.

Referring to the drawing in detail, the numeral 1 designates the front wheel, and the numeral 2 indicates the arms extending rearwardly from the steering knuckles which are connected with these wheels. The customary steering rod 3 is connected at its ends with these arms 2 for simultaneously operating the same. Moreover, the usual connection 4 is provided with one end of the steering rod, and is connected at its opposite end to the crank, or equivalent element 5 on the lower end of the steering column rod 6. These are conventional details that constitute no part of the present invention.

In accordance with the present invention, appropriate bearings 7 are secured upon the forward part 8 of the automobile, and these are adapted for rotary reception of the standards of the headlights 9. In the present instance the standards are provided at their lower ends with extension 10 of the peculiar shape shown in Figure 2. In this connection I would call attention to the construction of the headlight wherein it will be seen that the same is provided with the usual front lens, and in the present instance it is provided with a supplemental rear lens 11. This is disposed on the outer side of the casing, and the single source of illumination on the interior simultaneously subjects light rays through the two lenses. The forward light rays being cast in the direction of travel, and the rear light rays being passed at an angle toward the longitudinal sides of the roads.

Referring now to Figure 1, it will be seen that an operating member is connected at its outer end with the rear ends of the extensions 10. The operating member comprises duplicate sections 12 formed at their outer ends with forks which are pivotally connected with the extensions 10. At their inner ends these sections 12 are pivotally connected with a coupling 13 of the design shown, this coupling being formed with a clamp 14 which is rigidly connected with the central portion of the steering rod 3.

It will be seen that when the rod 6 is turned by the hand wheel in the usual way, and the wheels 1 are angled through the steering mechanism shown, this mechanism will act upon the dirigible headlights to turn them to assume the same angular movement as the wheel. This is of course accomplished by the positive connection between the central portion of the steering rod 3, and the extensions on the lower ends of the headlight standards. In this way the standards are rotated in their bearings to turn the headlights. Under this arrangement, when the automobile makes a turn at a bend, or curve in the path of travel, the rays of light from the headlight will follow the line of movement of the front wheels. Accordingly, the lights will be cast upon the path of travel at all times regardless of the direction of movement of the vehicle. Attention is also directed to the fact that in addition to the forwardly directed rays being advantageous by remaining in the line of movement, the rearward or diagonally projected rays pass through the lenses 11 are equally important in that they illuminate the marginal edges of the road to serve as a guide to the driver. Moreover, these lenses constitute indicators so that the driver may know at all times when his lights are properly lighted, and whether they are bright or dim.

No doubt, a careful consideration of the description in connection with the drawings will enable persons skilled in the art to which the invention relates to obtain a clear understanding of the same. Therefore, a more lengthy description is thought unnecessary.

While the preferred embodiment of the invention has been shown and described it is to be understood that minor changes coming within the field of invention claimed may be resorted to if desired.

Having thus described the invention, what I claim as new is:—

In combination, a wheel supported frame, bearings supported on said frame, headlights embodying standards, said standards being journaled for rotation in said bearings, the headlights being provided with front lenses and with auxiliary rear lenses, said rear lenses being disposed to permit light rays to be projected forwardly and rearwardly on a diagonal line at the same time, steering mechanism on said frame, and an operating connection between the steering mechanism, and headlight standards for turning said headlights to correspond with the direction of movement of the wheels on said frame.

In testimony whereof I affix my signature.

E. A. CLARK.